United States Patent [19]

Michaels

[11] 4,385,155
[45] May 24, 1983

[54] METHOD OF PREPARING CROSSLINKED POLY(VINYL ALCOHOL)

[75] Inventor: Alan S. Michaels, New York, N.Y.

[73] Assignee: W. R. Grace & Co., New York, N.Y.

[21] Appl. No.: 326,484

[22] Filed: Dec. 2, 1981

[51] Int. Cl.³ .............................. C08F 8/12; C08F 8/28
[52] U.S. Cl. .................................... 525/61; 252/8.5 A
[58] Field of Search .......................................... 525/61

[56] References Cited

U.S. PATENT DOCUMENTS

| 2,158,311 | 5/1939 | Starck et al. | 525/61 |
| 3,011,861 | 12/1961 | Tanabe et al. | 525/61 |
| 3,963,618 | 6/1976 | Muir | 525/61 |
| 4,164,602 | 8/1979 | Fabel | 525/61 |

Primary Examiner—Stanford M. Levin
Attorney, Agent, or Firm—Edward J. Cabic; Charles L. Harness

[57] ABSTRACT

Poly(vinyl acetate) latex reacted with an aldehyde at acid pH to prepare crosslinked poly(vinyl alcohol) suitable as water-loss agent in drilling fluids.

5 Claims, No Drawings

METHOD OF PREPARING CROSSLINKED POLY(VINYL ALCOHOL)

Crosslinked poly(vinyl alcohol) is a known water-loss agent in oil well drilling fluids.

The instant invention is directed to a novel process for preparing the crosslinked poly(vinyl alcohol) product.

In the processes of the prior art, crosslinked poly(vinyl alcohol) is made in two steps. In the first step, poly(vinyl acetate) is hydrolyzed and recovered. In the second step, the hydrolyzed product is treated with an aldehyde to crosslink it. The process of this invention combines both steps, thereby saving time, money, reactants and apparatus.

The following (simulated) examples demonstrate the inventive process.

EXAMPLE 1

One hundred grams of a poly(vinyl acetate) latex, containing 55% poly(vinyl acetate) by weight is acidified to pH 1.0 with HCl. 1.3 g of 37% formaldehyde is added and the mixture is heated to 80° C. for 5 hours with stirring. The product is then recovered by salting out with $Na_2SO_4$ and filtration, and dried at 70° C. The dried product is ground to pass through a 16 mesh screen.

The product is tested for performance by adding 1.5% of the product by weight and mixing with a 6% sodium bentonite slurry. The API fluid loss is 7 ml compared to 14 ml for the bentonite without fluid loss controller.

EXAMPLE 2

The reaction described in Example 1 is carried out in a 16% $Na_2SO_4$ aqueous solution. This results in the swelling of the polyvinyl alcohol instead of the dissolution. After the crosslinking reaction is completed, the product can be recovered by filtration.

In this variation, any liquid which results in a swollen polyvinyl alcohol can be used, but 16% $Na_2SO_4$ is preferred. The $Na_2SO_4$ concentration can vary by 2-3%, but 16% is close to saturation at ambient temperature.

GENERAL CONDITIONS

The latex concentration can vary. It can be as high as 60%, or as low as desired, e.g., 5-60%. The pH can be anywhere on the acid side, the lower the pH, the quicker the reaction. pH 1.0-1.5 is preferred, but 0-4 can be used. The subject ratio of poly(vinyl acetate) solids:aldehyde solids can be about 50-200:1.

Slightly higher or lower levels of formaldehyde can be used, depending on the degree of crosslinking desired. Other aldehydes can also be used, especially the dialdehydes, glyoxal and glutaraldehyde. With the dialdehydes 0.1-0.05 g/100 g of 55% latex is preferred for effective crosslinking. Other suitable aldehydes include, for example, acetaldehyde, propionaldehyde, glycolaldehyde, glyoxylic acid and the like or polyaldehydes, i.e., organic compounds having more than one aldehyde group in the compound, such as glyoxal (already mentioned), paraformaldehyde and the like. Other suitable aldehyde reactants include aldehyde generating agents, i.e., known organic compounds capable of forming an aldehyde group in situ, such as melamine-formaldehyde monomeric products and derivatives such as tri and hexa(methylol) melamine. Such materials can be formed by known conventional methods. The alkyl blocked derivatives are commercially available, are stable to self polymerization and are, therefore, preferred. Of all of the aldehyde reactants, the preferred reactants are paraformaldehyde, formaldehyde, glyoxal, and glutaraldehyde.

The reaction temperature can be varied between ambient (e.g., 20° C.) and 100° C., with 60°-80° C. being preferred. Reaction time can vary between 30 minutes and 24 hours.

Any standard method of separating the final product from the liquid phase can be used, including filtration, decantation, or evaporation. Drying temperatures can vary between 50° and 100° C., with 70°-80° C. being preferred. Any preferred mesh size can be used for the final product.

What is claimed is:

1. Method of preparing crosslinked poly(vinyl alcohol) comrpising reacting poly(vinyl acetate) latex with an aldehyde in an aqueous medium at a pH of about 0-4, with the weight ratio of poly(vinyl acetate):aldehyde of about 50-200:1, and removing the resulting crosslinked poly(vinyl alcohol).

2. Method according to claim 1 in which the aldehyde is a monomer selected from the group consisting of formaldehyde, paraformaldehyde, glyoxal, or glutaraldehyde.

3. Method according to claim 2 in which the aldehyde is formaldehyde, the pH is about 1.0-1.5; the latex at least is about 5% by weight of poly(vinyl acetate); the reaction temperature is about 20°-100° C.; and the reaction time is about 0.5-24 hours.

4. Method according to claim 3 in which about 100 parts by weight of poly(vinyl acetate) latex containing about 55% poly(vinyl acetate) by weight is acidified to pH 1.0 with hydrochloric acid; 1.3 parts by weight of 37% formaldehyde by weight is added; the reaction mixture is heated to about 80° C. for about 5 hours with stirring; and the product is recovered and dried.

5. Method according to claim 4 in which the aqueous medium contains 16% sodium sulfate.

* * * * *

UNITED STATES PATENT AND TRADEMARK OFFICE
CERTIFICATE OF CORRECTION

PATENT NO. : 4,385,155
DATED : May 24, 1983
INVENTOR(S) : Alan S. Michaels

It is certified that error appears in the above-identified patent and that said Letters Patent is hereby corrected as shown below:

Claim 1, line 2, replace "comrpising" with

--comprising--.

Signed and Sealed this

Nineteenth Day of July 1983

[SEAL]

Attest:

GERALD J. MOSSINGHOFF

Attesting Officer     Commissioner of Patents and Trademarks